United States Patent
Drake et al.

(10) Patent No.: US 7,590,907 B2
(45) Date of Patent: *Sep. 15, 2009

(54) METHOD AND APPARATUS FOR SOFT-ERROR IMMUNE AND SELF-CORRECTING LATCHES

(75) Inventors: Alan J. Drake, Round Rock, TX (US); AJ KleinOsowski, Austin, TX (US); Andrew K. Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/168,147

(22) Filed: Jul. 6, 2008

(65) Prior Publication Data

US 2008/0270862 A1 Oct. 30, 2008

Related U.S. Application Data

(63) Continuation of application No. 11/191,655, filed on Jul. 28, 2005, now Pat. No. 7,415,645.

(51) Int. Cl.
*G01R 31/28* (2006.01)
(52) U.S. Cl. ...................................... 714/726
(58) Field of Classification Search .................. 714/726, 714/731
See application file for complete search history.

(56) References Cited

U.S. PATENT DOCUMENTS

| | | | |
|---|---|---|---|
| 4,239,982 A * | 12/1980 | Smith et al. ................. | 327/142 |
| 5,031,180 A | 7/1991 | McIver et al. | |
| 5,144,230 A * | 9/1992 | Katoozi et al. .............. | 324/537 |
| 5,307,142 A | 4/1994 | Corbett et al. | |
| 6,028,983 A | 2/2000 | Jaber | |
| 6,127,864 A | 10/2000 | Mavis et al. | |
| 6,304,122 B1 | 10/2001 | Gregor et al. | |
| 6,504,410 B2 | 1/2003 | Waldie et al. | |
| 6,504,411 B2 | 1/2003 | Cartagena | |
| 6,538,488 B2 | 3/2003 | Zhang et al. | |
| 6,826,090 B1 | 11/2004 | Chu et al. | |
| 7,023,235 B2 * | 4/2006 | Hoff ............................ | 326/10 |
| 7,071,749 B2 * | 7/2006 | Gardner ...................... | 327/202 |
| 2001/0038304 A1 | 11/2001 | Waldie et al. | |
| 2002/0095641 A1 | 7/2002 | Cartagena | |
| 2004/0227551 A1 | 11/2004 | Gardner | |

* cited by examiner

*Primary Examiner*—James C Kerveros
(74) *Attorney, Agent, or Firm*—Libby Z. Handelsman; Jack V. Musgrove

(57) ABSTRACT

A scanned value is stored by loading the value into at least three latch stages, generating an output value based on a majority of the latch stage outputs, and feeding the output value back to the inputs of the latch stages to reload the latch stages with the latch circuit output value. Refreshing of the latch stages in this manner repairs any upset latch stage and restores the latch circuit to its original scanned state. The latch circuit may be repeatedly refreshed, preferably on a periodic basis, to prevent failures arising from multiple upsets. The feedback path may include a front-end multiplexer which receives the scan-in line and the output of the majority gate. Control logic selects the output value from the majority gate to pass to the latch stages during the refresh phase. The latch stages may be arranged in a master-slave configuration with a check stage at the slave level. The method is particularly suited for self-correcting scan latches of a microprocessor control system.

10 Claims, 5 Drawing Sheets

METHOD AND APPARATUS FOR SOFT-ERROR IMMUNE AND SELF-CORRECTING LATCHES

CROSS-REFERENCE TO RELATED APPLICATION

This application is a continuation of U.S. patent application Ser. No. 11/191,655 filed Jul. 28, 2005, now U.S. Pat. No. 7,415,645, issued Aug. 19, 2008.

BACKGROUND OF THE INVENTION

1. Field of the Invention

The present invention generally relates to computer systems, specifically to a method of storing values in latches of a computer system, and more particularly latches which store state information for extended periods of time.

2. Description of the Related Art

The basic structure of a conventional processing unit 10 for a computer system is shown in FIG. 1. In this example processing unit 10 is a dual-core processor having two processor cores 12a and 12b which carry out program instructions in order to operate the computer. Processing unit 10 also includes a memory subsystem 14, a scan controller 16, and a JTAG interface 18. The computer system may be a symmetric multi-processor (SMP) computer which uses a plurality of processing units 10 that are generally identical, that is, they all use a common set or subset of instructions and protocols to operate, and generally have the same architecture. An exemplary processing unit includes the POWER5™ processor marketed by International Business Machines Corp. which comprises a single integrated circuit superscalar microprocessor.

Each processor core 12a, 12b has its own control logic 20a, 20b, separate sets of execution units 22a, 22b and registers/buffers 24a, 24b, respective first level (L1) caches 26a, 26b, and load/store units (LSUs) 28a, 28b. Execution units 22a, 22b include various arithmetic units such as fixed-point units and floating-point units, as well as instruction fetch units, branch units and instruction sequencer units. The processor cores may operate according to reduced instruction set computing (RISC) techniques, and may employ both pipelining and out-of-order execution of instructions to further improve the performance of the superscalar architecture. Registers 24a, 24b include general-purpose registers, special-purpose registers, and rename buffers. L1 caches 26a, 26b (which are preferably comprised of separate instruction and data caches for each core) and load/store units 28a, 28b communicate with memory subsystem 14 to read/write data from/to the memory hierarchy. Memory subsystem 14 may include a second level (L2) cache and a memory controller. Processing unit 10 may communicate with other components of the computer system (memory and various peripheral devices) via a system or fabric bus 30. To facilitate repair/replacement of defective processing units in the computer system, processing unit 12 may be constructed in the form of a replaceable circuit board or similar field replaceable unit (FRU), which can be easily swapped, installed in or swapped out of system 10 in a modular fashion.

Processor cores 12a, 12b and memory subsystem 14 (functional units) are clock-controlled components, while scan controller 16 and JTAG interface 18 are free-running components. JTAG interface 18 provides access between an external device such as a service processor and scan controller 16. JTAG interface 18 complies with the Institute of Electrical and Electronics Engineers (IEEE) standard 1149.1 pertaining to a test access port and boundary-scan architecture. Scan controller 16 uses a scan communications extension that is allowed by standard 1149.1. Scan controller 16 is connected to various sets of scan latches located in the clock-controlled components, three of which are shown in FIG. 1. Scan latches 32a and 32b are respectively located in the control logic 20a, 20b of cores 12a, 12b, while additional scan latches 32c are located in memory subsystem 14. Only three sets of scan latches are illustrated for simplicity, but there may be many more located throughout processing unit 10.

Scan controller 16 allows the service processor to access the scan latches while the components are still running, via JTAG interface 18. The scan latches on a given chip are connected in a ring fashion with scan controller 16. The scan latches may include internal control and error registers (along with mode and status registers) which can be used to enable and check various functions in the components. In this manner, the service processor can access any chip in the multi-processing system via JTAG interface 50 and access registers while the system is running, without interruption, to set modes, pulse controls, initiate interface alignment procedures, read status of fault indication registers, etc. Scan controller 16 carries out these functions by setting an internal command register and an internal data register. Assembly code running on a component, particularly in the processor cores 12a, 12b, can allow the cores to utilize scan features as well. Thus a core can read status bits of another component and control the logic anywhere on its own chip. Scan controller 16 includes appropriate logic to arbitrate between JTAG interface 18 and any assembly code commands from the two processor cores.

Information stored in scan latches usually includes mode configurations for clock control logic, and clock control latches can account for a significant fraction of the microprocessor latch count. Microprocessors typically use control logic in local clock buffers to adjust the duty cycle and edge stressing of various clock pulses in the system and thereby meet the requirements of the local logic circuits. These clock buffer modes are set at system power-on using scan controller 16, and often must maintain their logical value for days or months to ensure proper performance of the local logic circuits. However, these values can be upset during microprocessor operation, e.g., from stray radiation or electrostatic discharge. This upset is correctable by scanning a new value, but the system may only allow scanning at power-on, meaning that the system must be restarted if a clock control latch becomes incorrectly set.

Robust latches have been designed with error-correction circuitry to address this problem. The error-correction circuitry generally relies on redundancy, at either the latch level or the device (transistor) level. For example, the latch disclosed in U.S. Pat. No. 5,307,142 uses device level redundancy to achieve single event upset (SEU) immunity. That latch has cross-coupled inverters with voltage dividers that prevent the logic state of a single one of the inverters from changing. In U.S. Pat. No. 6,127,864, a temporally redundant latch samples logic data at multiple time-shifted periods to provide multiple (independent) data samples from which the correct data can be selected. That latch has three sampling circuits that sample the logic data at three different times. The circuit described in U.S. Pat. No. 6,504,411 uses triplicate latches and a majority voting circuit to provide resistant to SEUs. The majority voting circuit indicates a set state for the redundant latch circuit based upon a majority of the latches being in the set state, or otherwise indicates a reset state.

These latch designs reduce, but do not eliminate, the problem of upsets. For instance, in a redundant latch structure with a majority voting circuit that holds a logical state for an extended period, it is possible to have two separate upsets, i.e., two of the three latches being set to an incorrect value, which then generates an incorrect output at the voting circuit. As a related issue, full redundancy in latch designs may be too costly in terms of physical size (chip area), speed, and power consumption. In modern, leakage power-dominated designs, it becomes increasingly important to reduce or eliminate any unnecessary redundancies. It would, therefore, be desirable to devise an improved latch design having less overhead that could still ensure reliability in case of single event upsets. It would be further advantageous if the latch could correct multiple errors resulting from more than one upset over time.

SUMMARY OF THE INVENTION

It is therefore one object of the present invention to provide an area efficient design for a self-correcting latch.

It is another object of the present invention to provide such a latch design that can handle multiple upsets over time.

It is yet another object of the present invention to provide a clock control system having self-correcting latches for storing microprocessor state information.

The foregoing objects are achieved in a method of storing a scanned value by loading the value into at least three latches stages, generating an output value based on a majority of the latch stage outputs, and feeding the output value back to the inputs of the latches to reload the latch stages with the output value. This refreshing of the latches repairs any upset latch stage and restores the latch circuit to its original (scanned) state. The latch circuit may be repeatedly refreshed, preferably on a periodic basis, to prevent failures arising from multiple upsets. In one implementation, the feedback path includes a front-end multiplexer having one input which receives the scan-in line and another input which receives the output of the majority gate. Control logic for the multiplexer selects the output value to pass to the latch stages during the refresh phase. The exemplary embodiment arranges the latch stages in a master-slave configuration with a check stage at the slave level. The master stage (controlled by a first clock signal) stores the value during a first clock half-cycle, and passes the value to the slave and check stages (controlled by a second clock signal) during the next clock half-cycle. The method is particularly suited for bits set at power-on which control of a microprocessor over its entire power-on hours.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
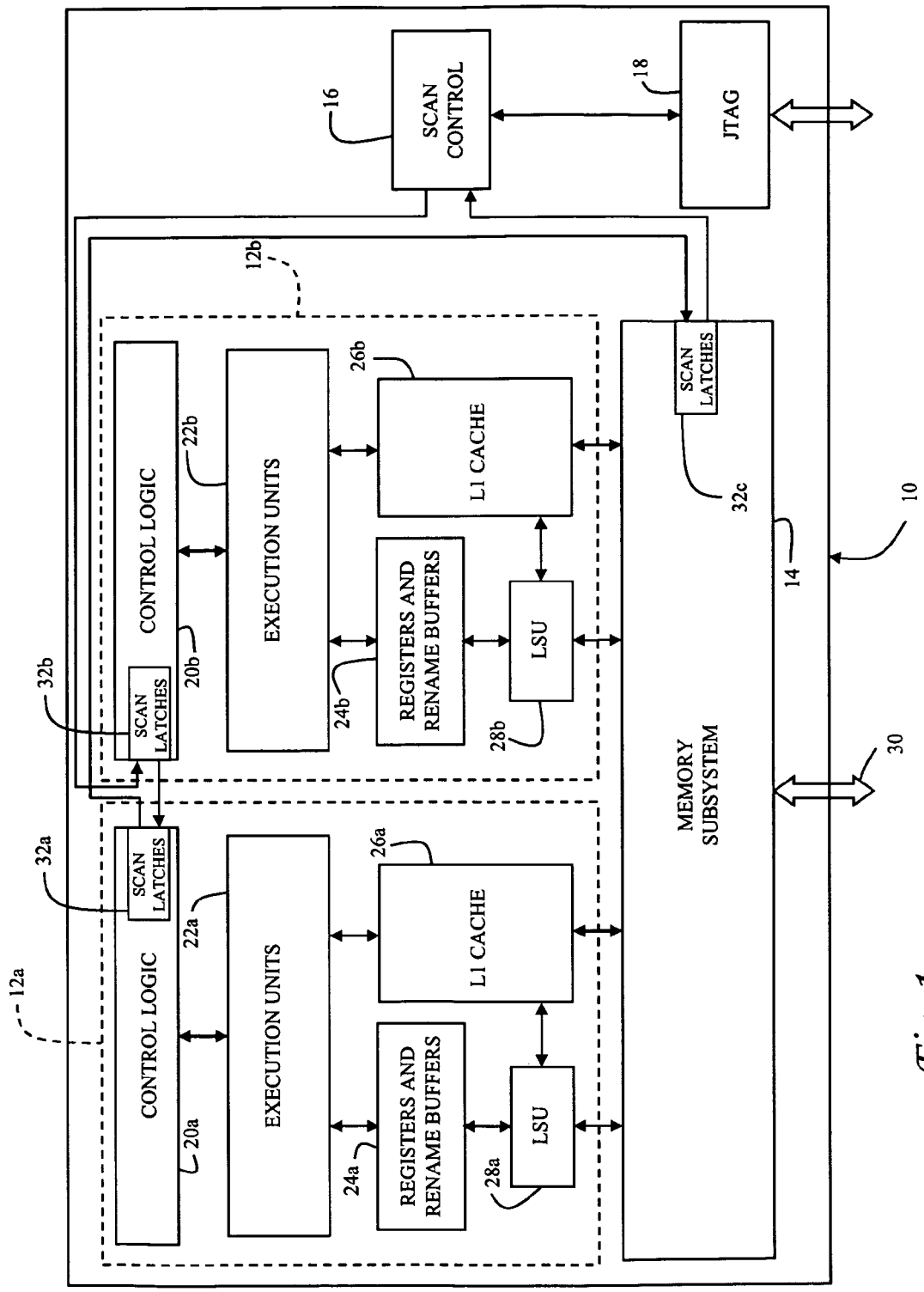
FIG. 1 is a block diagram of a conventional processing unit for a computer system which uses scan latches to store control information.
Figure 2:
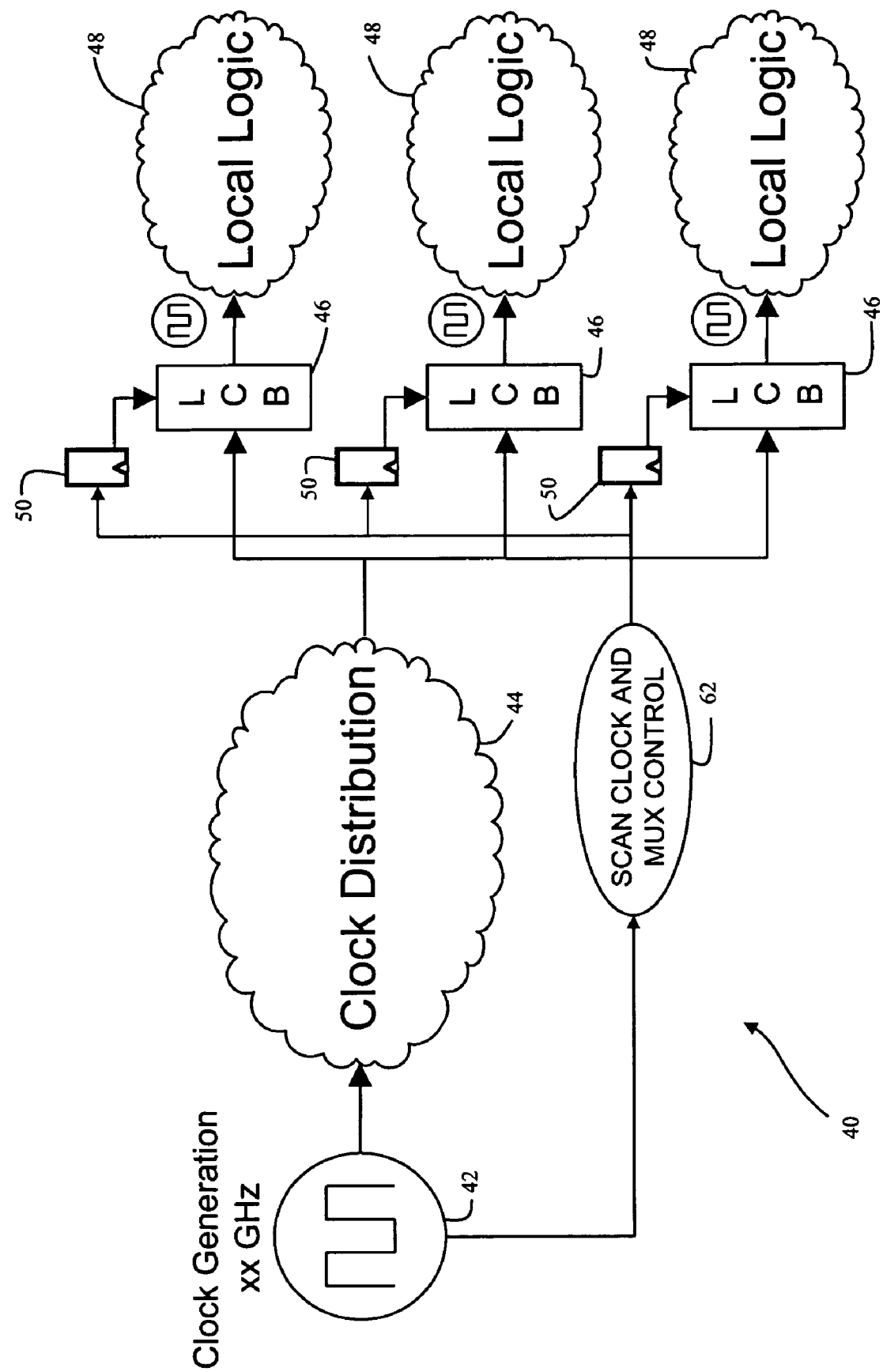
FIG. 2 is a high-level schematic diagram of one embodiment of a clock control system constructed in accordance with the present invention which utilizes self-correcting scan latches to store control information for local clock buffers.

With reference now to the figures, and in particular with reference to FIG. 2, there is depicted one embodiment 40 of a clock control system which utilizes a novel latch circuit constructed in accordance with the present invention. Clock control system 40 is adapted for use within an integrated circuit such as a microprocessor. While clock control system 40 provides one example of how the invention may be implemented, those skilled in the art will appreciate that the invention is not so limited, and may be used in other latch control systems of a microprocessor besides clock control systems.

Clock control system 40 is generally comprised of a clock generation circuit 42, a clock distribution network 44, and a plurality of local clock buffers (LCBs) 46. Clock generation circuit 42 includes a phase-lock loop to create a master clock signal. The master clock signal is fed to the clock distribution network to render synchronized global clock signals at LCBs 46. Each LCB 46 adjusts the global clock duty cycle and edges to meet the requirements of respective local logic circuits 48 (functional units) of the microprocessor. The local logic circuit may be, e.g., memory arrays or execution units of a processor core.

Each LCB has one or more control registers which can be set at power on using respective scan latch circuits 50. Scan latch circuits 50 have a novel construction which provides soft-error immunity and allows periodic refreshing to repair and self-correct any upset element of the latch and restore the latch to its original scanned state.

Figure 3:
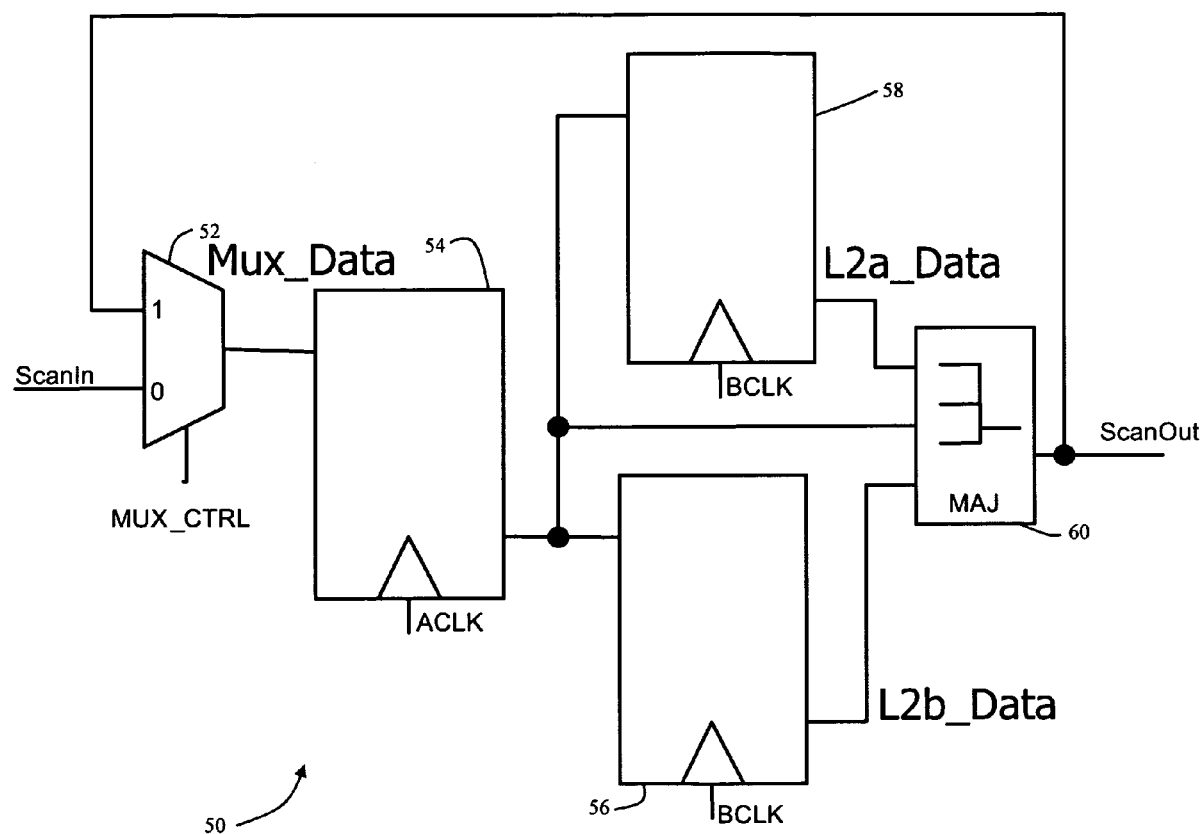
FIG. 3 is a detailed schematic diagram of one embodiment of a self-correcting latch constructed in accordance with the present invention.

One embodiment for scan latch circuit 50 is illustrated in FIG. 3, and is comprised of a 2-to-1 multiplexer 52, a master stage 54, a slave stage 56, a check stage 58, and a majority gate 60. One input to multiplexer 52 is the scan_in line from the computer system's scan ring. The output of multiplexer 52 is the input to master stage 54. The output of master stage 54 is the input for both slave stage 56 and check stage 58, so all of the master, slave and check stage inputs are indirectly coupled to the scan latch data input line. Master stage 54 is controlled by a first clock signal ACLK, while slave and check stages 56, 58 are controlled by a second clock signal BCLK. Master stage 54, slave stage 56 and check stage 58 may be any binary latch design, such as a D flip-flop. During scan mode, ACLK and BCLK are toggled to populate the master-slave latches with the scan_in value which is passed by multiplexer 52 (the multiplexer select signal, MUX_CTRL, is off). The additional check stage stores a copy of the data stored in the slave stage of the latch.

The outputs from master stage 54, slave stage 56 and check stage 58 are fed into the inputs of majority gate 60. The output generated by majority gate 60 is the output of scan latch circuit 50. If any one of the three stages 54, 56, 58 is upset during operation of the system, the output of scan latch circuit 50 still remains correct.

The output of majority gate 60 is also an input to multiplexer 52. During microprocessor operation, ACLK, BCLK and the multiplexer select signal MUX_CTRL are periodically strobed by control logic 62 (see FIG. 2). This action detaches the latches from the scan chain and enables a feedback path which selectively repopulates the master-slave-check latch stages with the majority vote of the values contained in the three stages. In this way, scan latch circuit 50 self-corrects if any one of the stages is upset during microprocessor operation.

Figure 4:
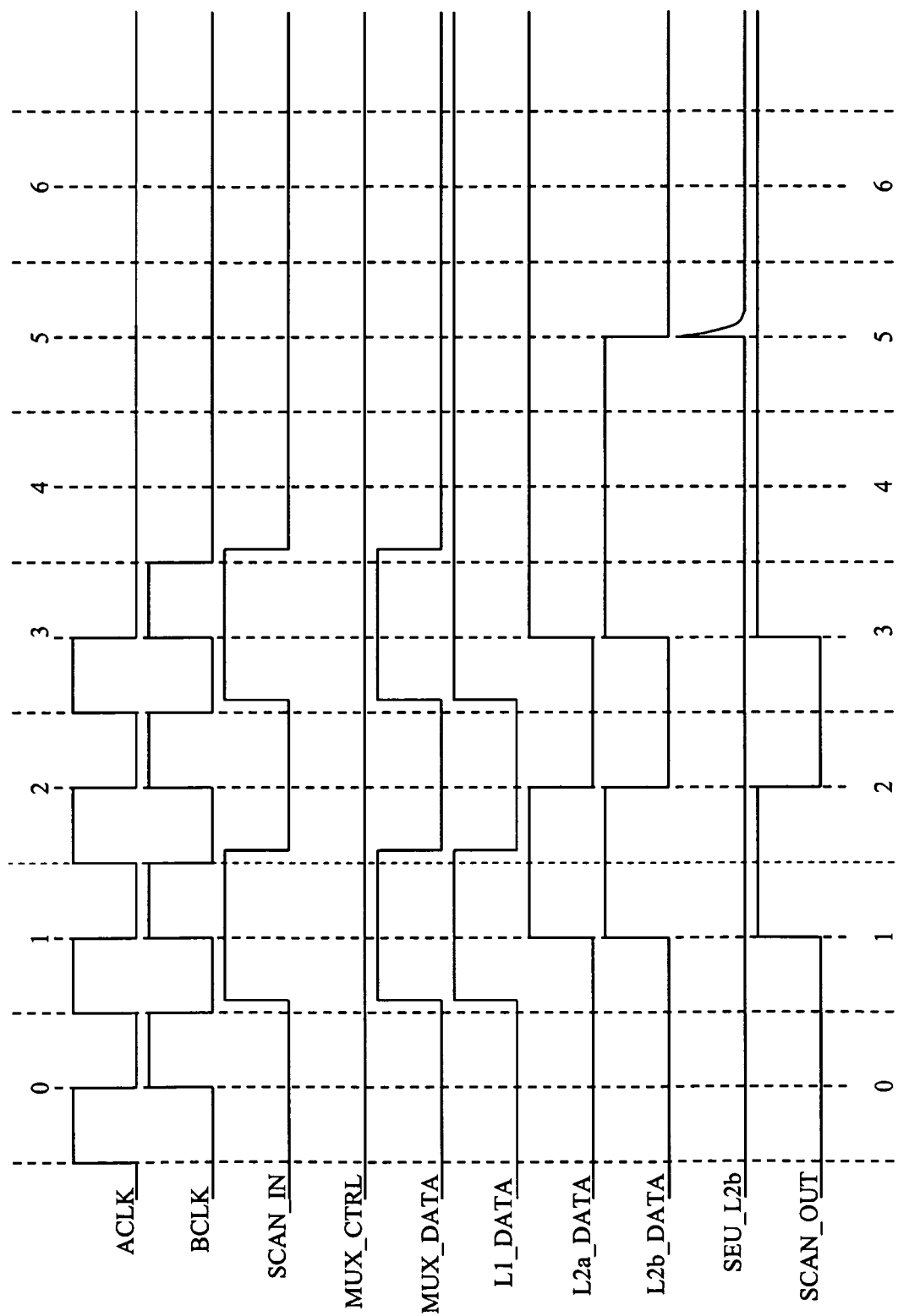
FIG. 4 is a timing diagram illustrating clock, data and control signals for operation of the latch of FIG. 3 with a single event upset.
Figure 5:
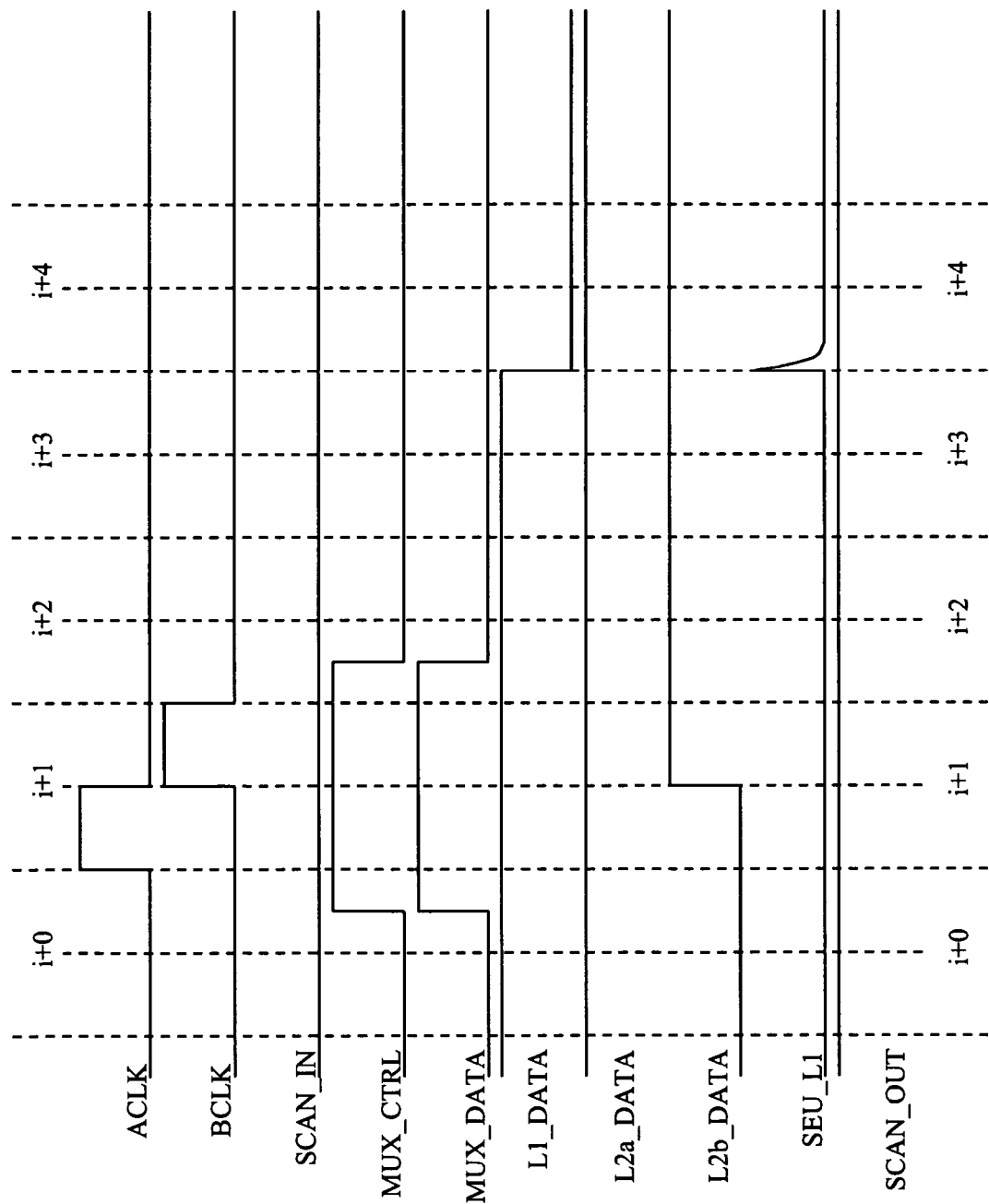
FIG. 5 is a timing diagram illustrating clock, data and control signals for operation of the latch of FIG. 3 with a later single event upset that follows repopulation of the soft-error immune latch.

The present invention may be further understood with reference to the timing diagrams of FIGS. 4 and 5. FIG. 4 illustrates operation of scan latch circuit 50 before and after a single event upset (SEU). The first four cycles in FIG. 4 depict normal scan-in of data into scan latch 50. In cycle 0, a value of logic "0" is scanned into master (L1_DATA) stage 54 when ACLK is active and, since the MUX_CTRL signal is off, the output of multiplexer 52 (MUX_DATA) is "0". This value propagates to the slave and check (L2a_DATA and L2b_DATA) stages 56, 58 in the next half-cycle when BCLK is active. In cycle 2, a value of logic "1" is scanned into master stage 54 when ACLK is again active and the output of multiplexer 52 becomes "1". This value propagates to the slave and check stages 56, 58 in cycle 2 when BCLK is active. This sequence of two loads is repeated in cycles 3 and 4. After data is scanned into all of the latches on the chain, clock signals ACLK and BCLK go low and remain low. At some arbitrary point thereafter (three cycles in this example), a first single even upset occurs (SEU_L2b), which is assumed to affect the contents of slave stage 56. The output of L2b_DATA then flips from "1" to "0", but the output of scan latch 50 (SCAN_OUT) remains "1" due to the operation of majority gate 60.

If a second SEU were to occur while scan latch circuit 50 is in the final state shown in FIG. 4 and caused one of the other stages (master L1 or check L2a) to flip, then two of the stages would be incorrect, and this would result in an erroneous output at majority gate 60. In order to prevent this outcome the present invention refreshes scan latch circuit 50 to correct any upset bits, as shown in FIG. 5. FIG. 5 begins at some cycle i after the scan-in phase started, with the L1_DATA and L2a_DATA signals correctly set high but the L2b_DATA signal incorrectly set low. The refresh phase begins in cycle i+1 when the MUX_CTRL signal is turned on, which feeds the high output of majority gate 60 to the MUX_DATA output. In the first half of cycle i+1 ACLK is toggled which latches the "1" value into master stage 54, and in the second half of cycle i+1 BCLK is toggled which passes this value to slave and check stages 56, 58, resetting the incorrect value held by slave stage 56. The MUX_CTRL signal is then deactivated. Thereafter, when a second upset (SEU2) occurs which flips the contents of master stage 54, the output of the scan latch remains unaffected since the majority gate output is still high.

This repopulation of the stages of scan latch circuit 50 occurs repeatedly at later times to prevent failures that might otherwise arise from multiple upsets over time. Scan latch circuit 50 may be refreshed in a programmable manner or by periodically strobing the clock and control signals, regardless of whether any SEU has actually occurred. The frequency of any periodic strobing can be based on empirical data. An exemplary period is about one hour.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the latch illustrated in FIG. 3 has a redundant L2 stage, but the invention may also be implemented with a redundant L1 stage (i.e., with the output of the front-end multiplexer feeding two L1 latch stages with only one L2 latch stage). It is therefore contemplated that such modifications can be made without departing from the spirit or scope of the present invention as defined in the appended claims.

What is claimed is:

1. A self-correcting latch circuit comprising:
 a data input line;
 at least first, second and third latch stages having inputs coupled to said data input line, wherein said first latch stage receives the data during a first clock half-cycle and passes the value to said second and third latch stages during a second clock half-cycle;
 a majority gate which receives outputs from said first, second and third latch stages and generates an output value; and
 a feedback circuit which selectively repopulates said latch stages with the output value after data has been loaded into the latch circuit.

2. The self-correcting latch circuit of claim 1 wherein the latch circuit is a scan latch that is part of a scan ring.

3. The self-correcting latch circuit of claim 1 wherein said feedback circuit repeatedly repopulates said latch stages at later times.

4. The self-correcting latch circuit of claim 3 wherein said feedback circuit repopulates said latch stages periodically.

5. The self-correcting latch circuit of claim 1 wherein said feedback circuit includes:
 a multiplexer having a first input connected to said data input line, a second input connected to an output of said majority gate, and an output connected to an input of a first one of said latch stages; and
 control logic which activates said multiplexer to select the output value to pass to said first latch stage.

6. A latch control system for a microprocessor having a plurality of functional units, comprising:
 at least one scan latch circuit located in a functional unit, said scan latch circuit storing state information used to control the functional unit, and having a master stage, a slave stage and a check stage, wherein said master stage receives the state information during a first clock half-cycle and passes the state information to said slave and check stages during a second clock half-cycle; and
 control logic which refreshes said master, slave and check stages after a scan-in of the state information to restore the state information to any of the stages which has undergone a logical upset.

7. The latch control system of claim 6 wherein said control logic repeatedly refreshes said stages at later times.

8. The latch control system of claim 7 wherein said control logic refreshes said stages periodically.

9. The latch control system of claim 6 wherein said control logic includes:
 a majority gate which receives outputs from said master, slave and check stages and generates an output value;
 a multiplexer having a first input connected to a scan-in line, a second input connected to an output of said majority gate, and an output connected to an input of said master stage; and
 scan clock control logic which activates said multiplexer to select the output value to pass to said master stage in response to a first clock signal, and passes the output value from said master stage to said slave and check stages in response to a second clock signal.

10. The latch control system of claim 6 wherein the scan latch circuit stores clock control information, and further comprising:
 a clock generation circuit which creates a master clock signal;
 a clock distribution network which uses the master clock signal to render a global clock signal; and
 at least one local clock buffer which adjusts the global clock signal based on the state information stored in said scan latch circuit.

* * * * *